June 5, 1956  J. H. WHEELER  2,748,934
EXTRUSION APPARATUS
Filed Oct. 4, 1952  4 Sheets-Sheet 1
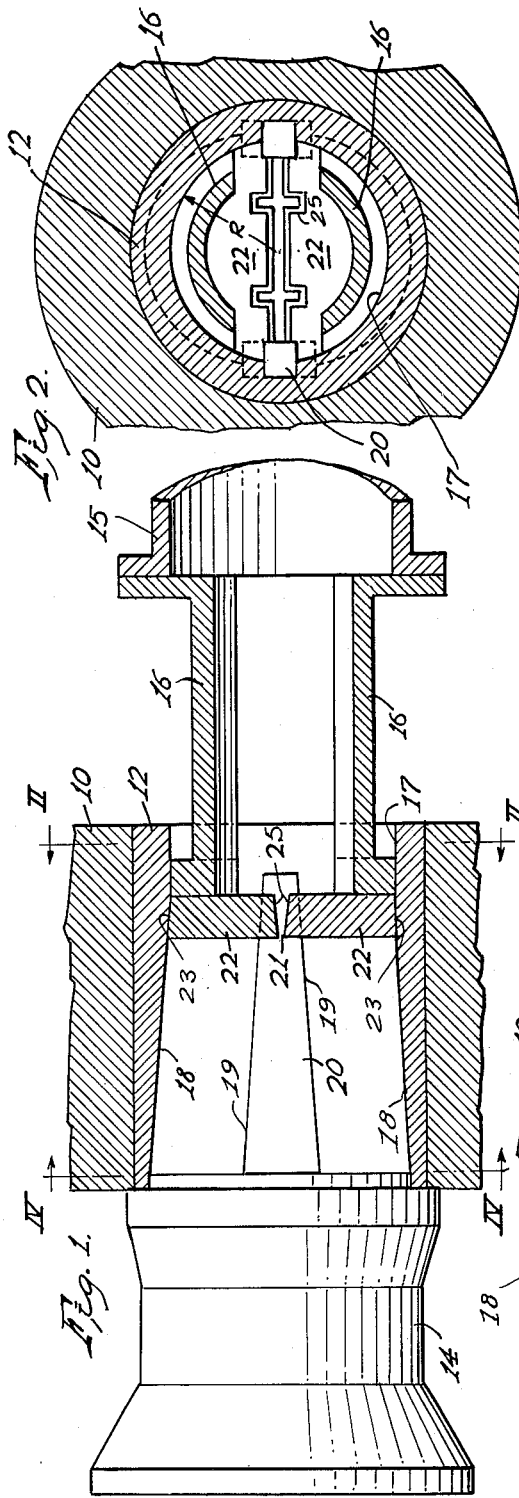
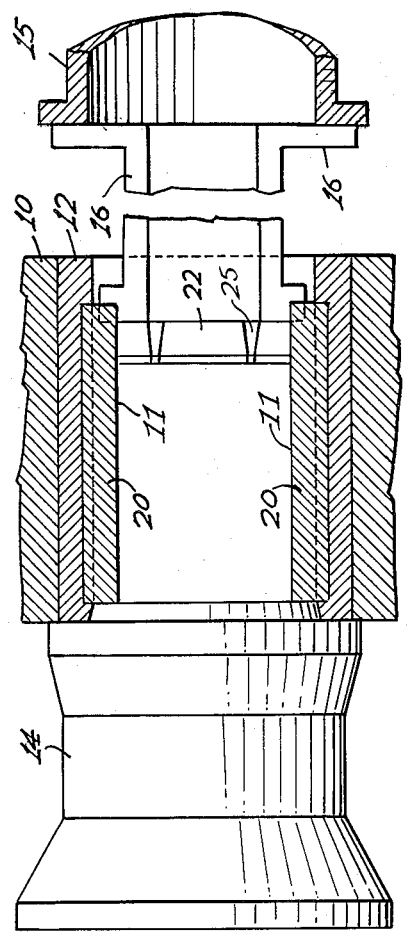
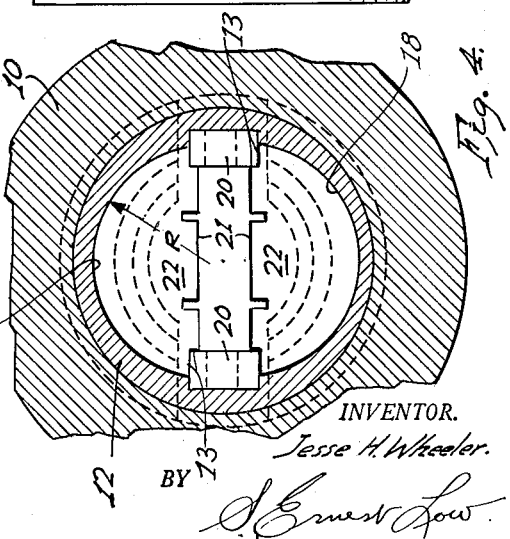
INVENTOR.
Jesse H. Wheeler.
BY
S. Ernest Low
ATTORNEY.

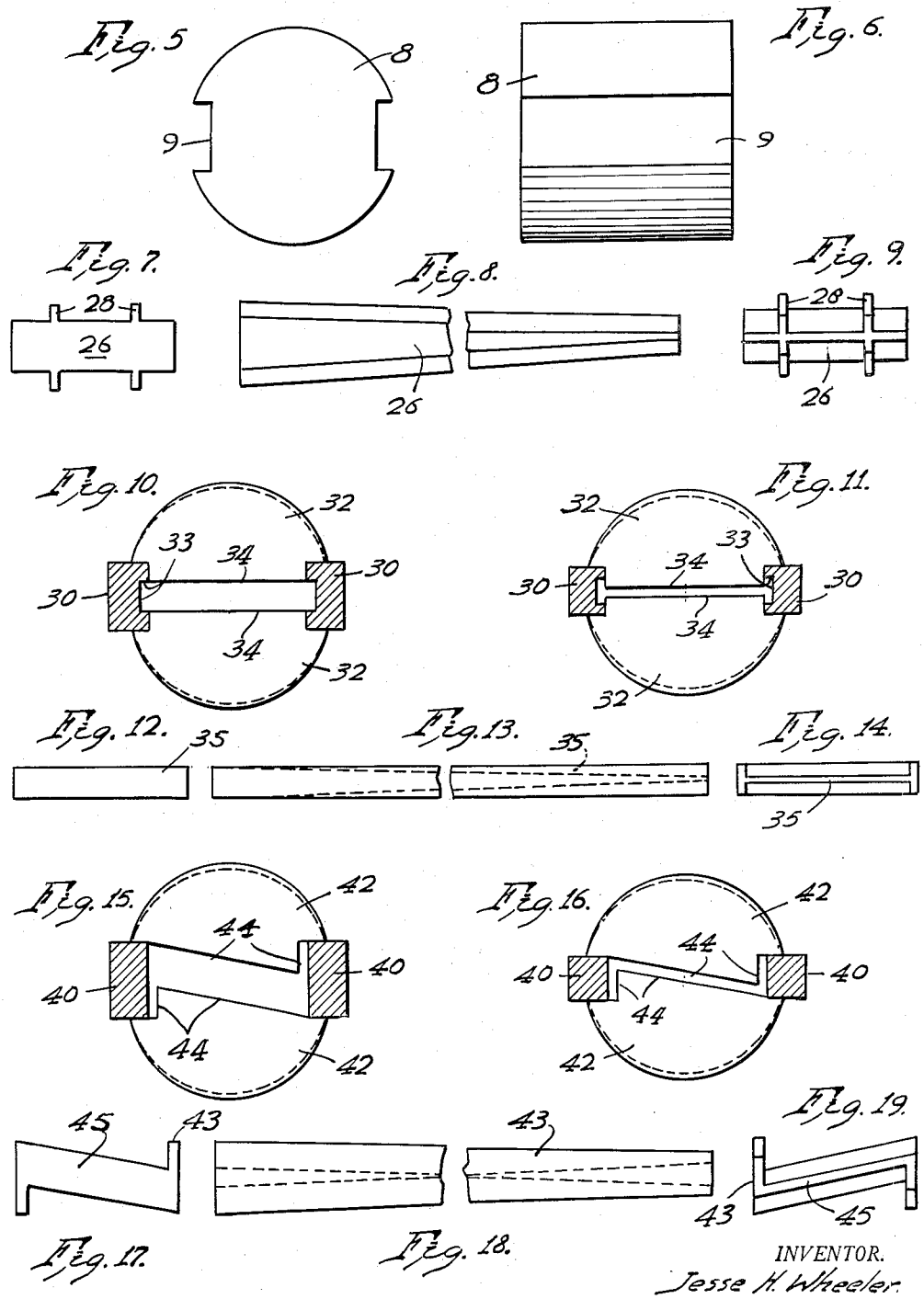

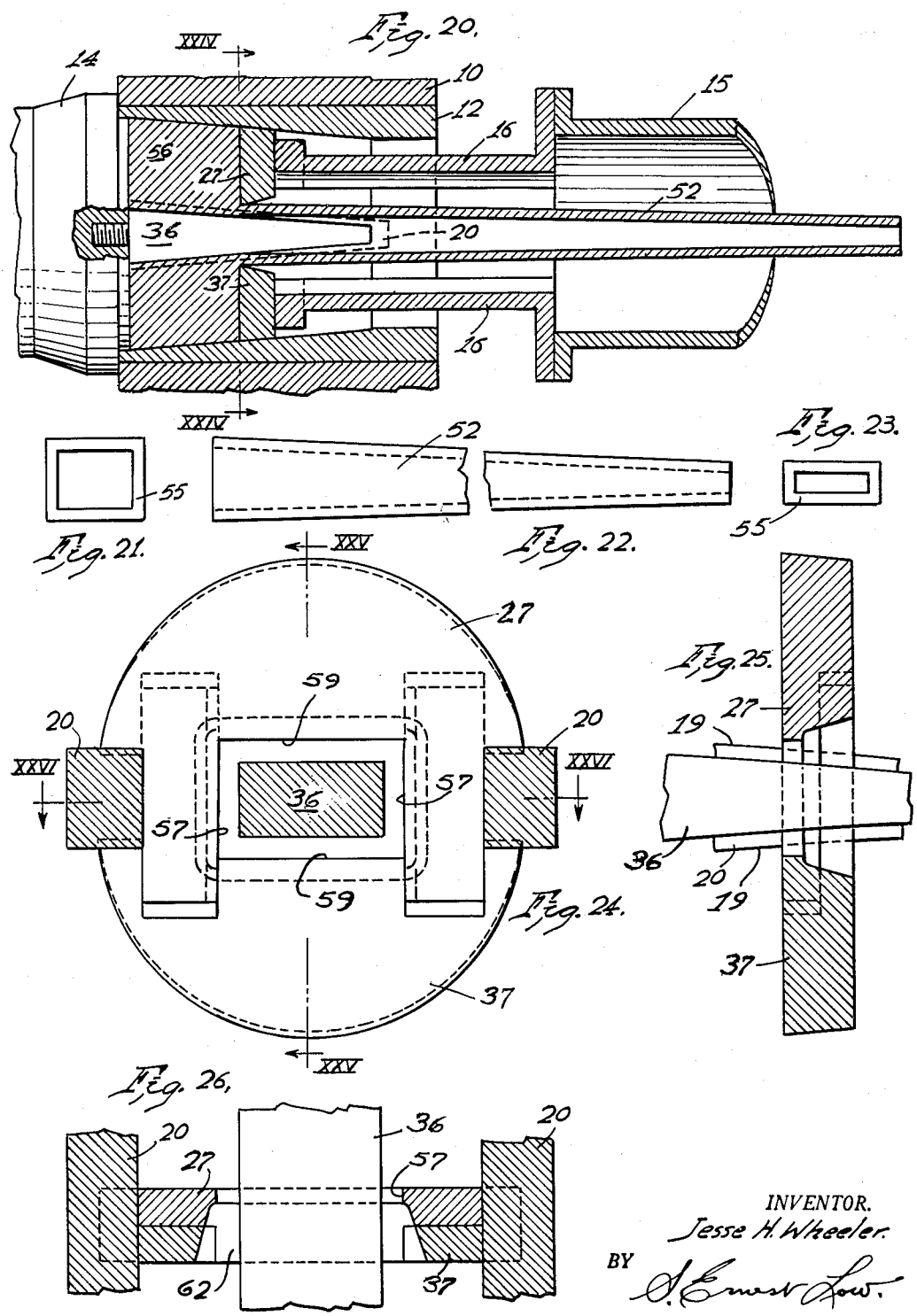

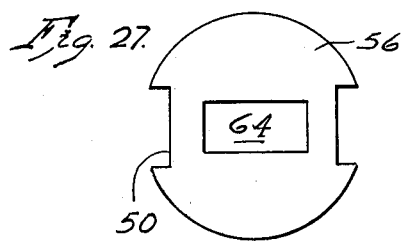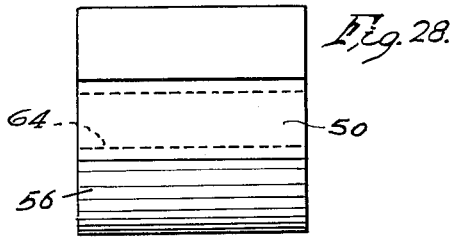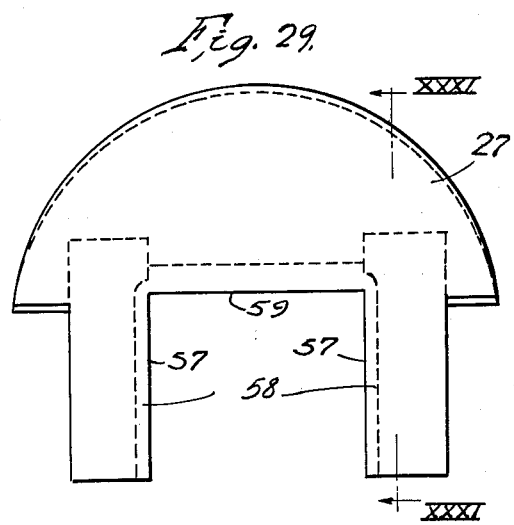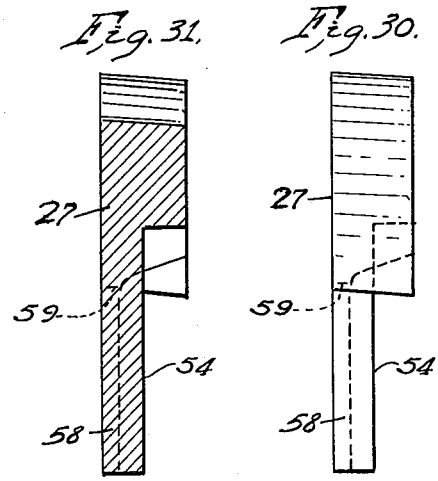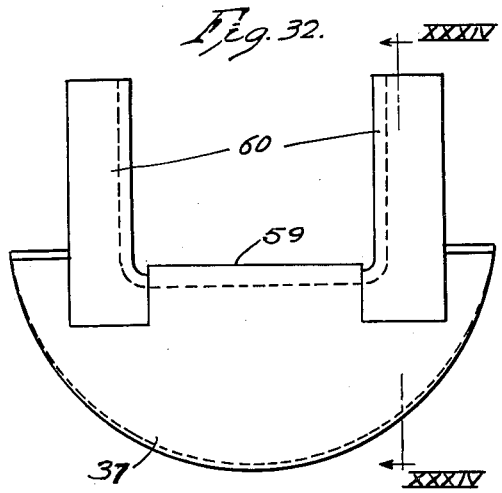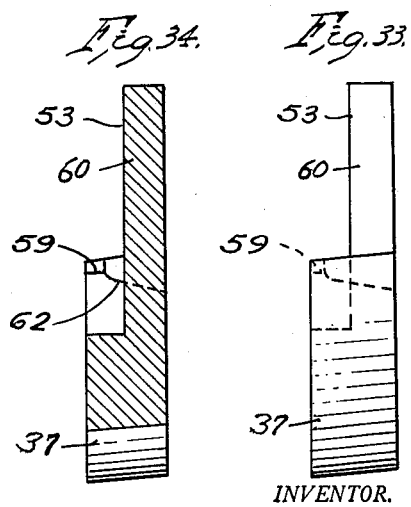

United States Patent Office 2,748,934
Patented June 5, 1956

2,748,934

EXTRUSION APPARATUS

Jesse H. Wheeler, Dayton, Ind., assignor to Aluminum Company of America, Pittsburgh, Pa., a corporation of Pennsylvania Application October 4, 1952, Serial No. 313,126

6 Claims. (Cl. 207—18)

This invention relates in general to the art of extrusion and in more specific terms to indirect extrusion apparatus or equipment, as distinguished from direct extrusion, for the production of solid and tubular extruded sections of varying lineal cross-section.

By "direct extrusion" is meant an extrusion process and apparatus wherein material to be extruded is initially confined within a container, having a die opening or orifice leading therefrom, and is acted upon by a pressure-exerting ram within the container to force or die-express the same through the die opening. As such, direct extrusion entails, as an essential element of the power required to perform an extrusion operation, overcoming the frictional resistance developed between the wall or walls of the container and the material under extrusion. By "indirect extrusion" is meant an extrusion process and apparatus which includes the same basic die, pressure-exerting member or ram and container elements essential to "direct extrusion," the prime difference being, however, that the wall or walls of the confining container and the material under extrusion are relatively static in respect to each other, which may result through movement of the die into the container or movement of the container and its confined material as a unit over the die, either of which means of operation eliminates the existing frictional resistance between the container and the material under extrusion in the performance of a direct extrusion operation.

It is a primary object of the invention to provide extrusion apparatus or equipment capable of repeated duplication of accurately dimensioned extruded sections of varying lineal cross-section by the indirect extrusion process.

Other objects of the invention include the provision of simplified extrusion die structures and modification of presently existing extrusion equipment to adapt the same to the production of tapered extruded members, such as employed as structural elements, for example wing spars in aircraft construction, or the like.

On reference to the drawings appended hereto and forming a part hereof, taken in conjunction with the following specification, mechanisms falling within the contemplation and scope of the present invention will be more fully understood. In the drawings:

Fig. 1 represents a fragmentary medial sectional elevation through an extrusion mechanism constructed in accordance with the invention;

Fig. 2 represents a sectional elevation taken on the plane II—II of Fig. 1;

Fig. 3 represents a fragmentary medial sectional elevation similar to Fig. 1 but on a plane at right angles thereto;

Fig. 4 represents a sectional elevation taken on the plane IV—IV of Fig. 1;

Fig. 5 represents an end elevational view of an extrusion billet suitable for charging into the extrusion mechanism of Figs. 1 through 4;

Fig. 6 represents a side elevational view of the extrusion billet of Fig. 5;

Fig. 7 represents an elevational view of the large end of a tapered extrusion produced in the extrusion mechanism of Figs. 1 through 4;

Fig. 8 represents a side elevational view of the same tapered extrusion;

Fig. 9 represents an end elevational view of the small end of the tapered extrusion of Figs. 7 and 8;

Fig. 10 represents a front elevational view of an extrusion die arrangement in its expanded or opened position at or near the end of an extrusion operation;

Fig. 11 represents a front elevational view of the extrusion die arrangement of Fig. 10 at or near the start of an extrusion operation;

Fig. 12 represents an end elevational view of the large end of a tapered extrusion produced by the extrusion die arrangement of Figs. 10 and 11;

Fig. 13 represents a side elevational view of the same tapered extrusion;

Fig. 14 represents an end elevational view of the small end of the extrusion of Figs. 12 and 13;

Fig. 15 represents a front elevational view of an extrusion die arrangement in its expanded or opened position at or near the end of an extrusion operation;

Fig. 16 represents a front elevational view of the extrusion die arrangement of Fig. 15 at or near the start of an extrusion operation;

Fig. 17 represents an end elevational view of the large end of a tapered extrusion produced by the extrusion die arrangement of Figs. 15 and 16;

Fig. 18 represents a side elevational view of the same tapered extrusion;

Fig. 19 represents an end elevational view of the small end of the tapered extrusion of Figs. 17 and 18;

Fig. 20 represents a fragmentary medial sectional elevation similar to Fig. 1 but designed to produce a hollow tapered extrusion;

Fig. 21 represents an elevational view of the large end of the tapered extrusion produced in the extrusion mechanism of Fig. 20;

Fig. 22 represents a side elevational view of the same tapered extrusion;

Fig. 23 represents an end elevational view of the small end of the tapered extrusion of Figs. 21 and 22;

Fig. 24 represents a fragmentary sectional elevation to enlarged scale taken on the plane XXIV—XXIV of Fig. 20;

Fig. 25 represents a fragmentary sectional elevation taken on the plane XXV—XXV of Fig. 24;

Fig. 26 represents a fragmentary sectional view taken on the plane XXVI—XXVI of Fig. 24;

Fig. 27 represents an end elevational view of an extrusion billet suitable for use with the extrusion mechanism of Fig. 20;

Fig. 28 represents a side elevational view of the extrusion billet of Fig. 27;

Fig. 29 represents a front elevational view of the upper die half of Figs. 20 and 24 through 26;

Fig. 30 represents a side elevational view of the die half of Fig. 29;

Fig. 31 represents a sectional elevation taken on the plane XXXI—XXXI of Fig. 29;

Fig. 32 represents a front elevational view of the lower die half of Figs. 20 and 24 through 26;

Fig. 33 represents a side elevational view of the die half of Fig. 32; and

Fig. 34 represents a sectional elevation taken on the plane XXXIV—XXXIV of Fig. 32.

In general terms, the invention is directed to an indirect extrusion apparatus incorporating, as its basic elements, a generally tubular container for confining material to be extruded, a segmental die for controlling the exterior configuration or cross-section of the extruded product, and means associated with the segmental die and interior surface of the container for changing the cross-sectional area of the die opening formed between the segments of the die in response to the relative axial co-planar position of the die segments in respect to the axial length of the container.

Figs. 1 through 19 serve to illustrate indirect extrusion apparatus and die structures therefor which are particularly adapted to the production of solid tapered sections in accordance with the invention. Figs. 1 through 9 illustrate extrusion equipment suitable for the production of a tapered section of substantially rectangular cross-section provided with longitudinal strengthening ribs on oppositely disposed surfaces thereof.

The extrusion equipment for producing the aforesaid tapered extrusion comprises a container 10, for confining the material to be extruded, which is preferably equipped with a liner 12. As best illustrated in Figs. 1 through 4, the liner 12 is preferably provided with a right cylindrical bore 17, defined by a surface of revolution of radius R, over a short distance of its length, as viewed in section in Figs. 1 and 2. The remaining length of the sleeve or liner 12 is preferably defined by axially tapered curved surfaces 18 of the same radius R on oppositely disposed sides of the horizontal plane through the axial center line of the liner, as viewed in Figs. 1 and 4, and is otherwise contiguously enclosed by parallel non-tapering surfaces (Fig. 3) in planes normal to the horizontal plane through the central axis of Figs. 2 and 4.

The container 10 and its tapered liner 12 are preferably supported in pressure-resisting relationship in abutment with a block member 14.

A hollow ram 15, relatively movably mounted in respect to the container 10 and abutment block 14, is suitably disposed in axial alignment with the right cylindrical portion 17 of the liner 12. The ram member 15 has secured thereto bifurcated members 16 which are provided adjacent their left-hand ends, as viewed in Figs. 1, 2 and 3, with arcuate bearing flanges which preferably slidingly engage the short right cylindrical bore portion 17 of the liner 12.

Tusks, guide members or rails 20 are suitably secured within the sleeve 12 over at least the tapered length thereof. The rails 20 are preferably secured to, or held within keyways or grooves machined or otherwise formed in, oppositely disposed parallel walls of the liner 12 contiguously and tangentially connecting the tapered surfaces 18. The tusks 20 present axially parallel surfaces projecting inwardly and facing inwardly toward the longitudinal central axis of the liner 12 and are preferably tapered along their inwardly projecting ledge surfaces 19 to the same degree of angularity as the tapered surfaces 18, determined on the vertical medial plane illustrated in Fig. 1.

A female or exterior configuration controlling extrusion die, preferably composed of two similar die segments 22, is constructed with peripheral or marginal surfaces 23 which register with and conform to the liner-defining tapered curvilinear surfaces 18, as well as being notched at 13 to conform with the parallel surfaces 11 and tapered surfaces 19 of the tusks 20. The die segments 22 are also machined, or otherwise formed, at 21 to provide a die orifice therebetween, the egress or discharge side of the orifice being relieved at 25 to reduce frictional resistance through the die.

It will be observed from the description of the extrusion apparatus and segmental extrusion die, illustrated in Figs. 1 through 4, that axial movement of the die segments 22 into the sleeve 12 from their position illustrated in Fig. 2 to that illustrated in Fig. 4 will result in opening or spreading the die segments during their lineal movement along the tapered tusks 20. Such movement of the die segments 22 against a material to be extruded, and confined within the liner 12, results in the production of an extruded length of product varying in cross-section from that defined by the die segments in their location adjacent the right hand end of linear 12 (Figs. 1 and 2) to the enlarged cross-section defined by the die segments 22 in Fig. 4. Relative movement of the die segments in respect to the liner 12 may be accomplished by advancing the tubular ram 15 and its bifurcated leg members 16 against die segments 22 to translate the latter into the liner 12 against the resistance of stationary block member 14, or the block 14, its abutting container 10 and liner 12 may be advanced from left to right, as illustrated in Fig. 1, against the resistance of ram 15, its attached bifurcated leg members 16, and abutting die segments 22. In either mode of operation material under extrusion confined within the liner 12 between the block 14 and die segments 22 will be indirectly extruded through the die aperture 21 and discharged from the apparatus through the tubular ram 15.

Where the material under extrusion is selected in the form of a solid, such for example an aluminum alloy billet, the cylindrical billet 8 of Figs. 5 and 6 is preferably employed. In this connection, the diameter of the billet would preferably be substantially equal to the diameter of the right cylindrical bore 17 of the liner 12, longitudinally notched at 9 to accommodate the largest inwardly projecting cross-sectional area of the tusks 20 and substantially equal in length to the distance between the front billet contacting surfaces of the die segments 22 (Fig. 1) and the cylinder and liner abutting face of the abutment block 14.

Charging of the material to be extruded into the container 10 is accomplished through either end entrance to the liner 12, the block 14 being retractable, if desired, for this purpose. Retraction of the ram 15, and its bifurcated attachments 16, is a normal provision in extrusion apparatus and permits both charging of the apparatus and replacement of the die segments 22. The die segments may also be entered into the liner 12 by retracting the block 14.

Regardless of the material extruded by the indirect extrusion process carried out in the extrusion apparatus of Figs. 1 through 4, typical extruded section produced thereby is illustrated in side and end elevations in Figs. 7 through 9. Therein is disclosed an extruded section 26 of uniform taper over its length, having re-enforcing ribs 28 of uniform depth projecting outwardly from the tapered web portion of the section on oppositely disposed tapered sides thereof.

Figs. 10 and 11 illustrate front or ingress face, elevational views of a pair of die segments 32 in their fully opened and starting positions, respectively, when associated with tapered rails or tusks 30 in an apparatus of the type illustrated in Figs. 1 through 4. In this instance the tusks or rails 30 are machined or otherwise formed along their parallel oppositely disposed surfaces at 33 and the die segments machined or otherwise formed at 34 to provide a die aperture or orifice for the production of an I-section having a tapered web 35 and uniform width flanges, illustrated in Figs. 12, 13 and 14.

Figs. 15 and 16 illustrate front or ingress face, elevational views of a pair of die segments 42 in their fully opened and starting positions, respectively, when associated with tapered rails or tusks 40 in an apparatus of the type illustrated in Figs. 1 through 4. In this instance the die segments 42 are machined or otherwise formed at 44 to provide a die orifice or aperture therebetween which is of generally Z-cross section. On reference to Figs. 17 through 19, it will be observed that the tapered extruded Z-section produced through the die of Figs. 15 and 16 incorporates uniformly tapered flanges 43 and similarly tapered web 45.

The remaining illustrations (Figs. 20 through 34) relate to indirect extrusion apparatus, of the general type previously described in reference to Figs. 1 through 4, as applied to the production of tubular extrusions of varying or tapering cross-section over their lengths. Similar reference numerals have been employed to identify like elements in both forms or embodiments of the invention, the chief differences in the two forms of apparatus lying in the use of a core or mandrel 36 and a modified form of segmental die structure, represented by the reference numerals 27 and 37, in the form of apparatus for producing tubular tapered extrusions.

It will be observed on reference to Figs. 20, and 24 through 26 that a mandrel 36 has been rigidly attached to the block member 14 to project forwardly through the liner 12 into the aperture formed between the die segments 27 and 37. The die segments 27 and 37 have been selected for the purpose of defining the exterior configuration of the tapered extrusion 52 of rectangular cross-section, and the mandrel or core 36 has beeen selected with the same taper as the liner 12 and tusks 20 to insure uniform wall thickness 55 over the length of the extrusion.

Whereas the inwardly facing parallel surfaces of the tusks or guides 20 co-operated with the separable die segments 22, 32 and 42 in defining the several die orifices in the indirect extrusion apparatus of Figs. 1 through 4, die segments 27 and 37 are of overlapping construction and define the entire exterior periphery or perimeter of the tubular extrusion 52.

Reference to Figs. 24 through 26 and 29 through 34 will clearly illustrate the overlapping structure incorporated in the die segments 27 and 37, the upper segment 27 being provided with downwardly depending legs 58 in the plane of the front or ingress face of the die segment and the lower segment 37 being provided with upwardly projecting legs 60 in the plane of the rear or egress side of the die segment. The rear plane surfaces 54 of the downwardly depending legs 58 are adapted to bear against the front plane surfaces 53 of the upwardly projecting leg members 60 in all positions of vertical separation of the die segments 27 and 37, the leg portions 58 being provided with die bearing surfaces 57 defining oppositely disposed parallel surfaces of the extended section and the oppositely disposed body portions of the die segments 27 and 37 being provided with die bearing surfaces 59 defining the tapering surfaces of the extruded section. The die orifice formed between the die segments 27 and 37 may otherwise be relieved on its egress or discharge side, as at 62.

It will be manifest from the description of the modified form of indirect extrusion apparatus and die structure for the production of tubular tapered extrusions that the operation of the equipment is similar to that described for Figs. 1 through 4. As in the first described mechanism, the material to be extruded may be selected in the form of a solid generally cylindrical billet 56, such as illustrated in Figs. 27 and 28, of a maximum diameter of substantially the smallest diameter of the liner 12, notched at 50 to accommodate the largest inwardly projecting cross-sectional area of the tusks 20, and provided with a central through aperture or bore 64 to accommodate the mandrel 36.

All forms of the indirect extrusion apparatus have been illustrated in terms of producing symmetrical extrusions. It will be apparent to one skilled in the extrusion art, based on knowledge of the invention thus far described, that the die orifices may be dissimilar in respect to a horizontal plane intersecting the oppositely disposed tusks 20 and normal to which plane the die segments are separated in the operation of the several die arrangements described hereinabove. For example, the underside or ledges 19 of the tusks 20 could be axially parallel with the longitudinal central axis of the liner 12 and the lower curvilinear surface 18 of the liner 12 of right cylindrical form over its entire length to thereby produce extrusions having a taper only on the upper surfaces thereof. Similarly, either one of a pair of die segments co-operating to form the several die orifices could be varied to produce a non-symmetrical extrusion.

A feature of the invention, which lends itself to ready and facile adaptation to presently existing extrusion equipment, arises from the fact that modern extrusion apparatus normally employs cylindrical liners within their billet or material confining cylinders. To convert such liners in the practice of the present invention entails relatively simple machine tool operations. For example, normally employed cylindrical liners are replaceable and it remains a simple machine tool operation to offset or taper bore such a liner to provide the liner 12 of the present invention. As previously described, the tapered bore may be provided on one or both sides of a horizontal plane through the central longitudinal axis of an originally right cylindrical liner. Completion of the enclosing walls of the liner is accomplished through installation of the tusks 20 with their inwardly facing axially parallel surfaces.

Having described the invention in general, as well as in specific terms, it is to be understood that it is not to be limited in any way other than as defined in the appended claims.

What is claimed is:

1. An indirect extrusion apparatus for producing tubular extrusions of varying lineal cross-section, said apparatus comprising a container for confining material to be extruded and a segmental die sealed and slidable on the interior surface of the container, an axially tapered wall surface in said container, a complementary axially tapered guide member in fixed relation within and in respect to the container in engagement with at least one die segment otherwise sealed and slidable in respect to the axially tapered wall surface of the container, a mandrel secured in said container and extending through the die, and means for obtaining relative movement between said die segments as a unit and said container axially in respect to said guide member and mandrel, said relative movement effecting separation of the die segments and a die orifice formed therebetweeen in direct relation to the axial taper of the container surface and guide member.

2. An indirect extrusion apparatus for producing tubular tapered extrusions comprising a container for confining material to be extruded, said container having a contiguous confining surface axially of its length, a portion of said contiguous confining surface being axially tapered, a two-part segmental die, a mandrel secured in said container and extending through the die, said die parts having edge bearing surfaces complementary to the contiguous confining surface of the container and slidable thereon to constitute a seal on the contiguous confining surface along the axial length thereof, a guide member within said container stationary in respect thereto, said guide member having a tapered surface axially complementary to the axially tapered portion of the container surface and facing towards the same in parallel relationship thereto, said tapered guide surface engaging and supporting one of said die parts in sealed edge bearing relationship on the axially tapered confining surface portion of the container, and means for axially moving the die parts as a unit relative to the container, guide member and mandrel.

3. An extrusion apparatus for producing extrusions of varying lineal cross section by indirect extrusion, said apparatus comprising a container for receiving and confining material to be extruded, said container having an axially tapered interior surface, a guide member within said container fixed in respect thereto and presenting a complementary axially tapered surface parallel to, spaced from and facing the tapered interior surface of the container, a segmental die block slidable and peripherally sealed in respect to the interior surface of the container and having an orifice therethrough, a segment of said die block being slidably supported on the axially tapered guide surface, and means for obtaining co-planar axial movement of the segmental die block as a unit relative to the container and fixed guide member as a unit, whereby said relative movement effects separation of the segments of the die block to enlarge the orifice therethrough in direct relation to the axially tapered surfaces on the guide member and interior surface of the container.

4. An extrusion apparatus for producing extrusions of varying lineal cross section by indirect extrusion, said apparatus comprising a container having a contiguous interior confining surface an uninterrupted portion of which is axially and uniformly tapered over a uniform width thereof, a pair of guide members within the container fixed in respect thereto and each presenting a complementary tapered surface parallel to, spaced from and facing the tapered interior surface of the container over its axially tapered length, a segmental die block slidable on and peripherally sealed in respect to the interior contiguous surface of the container and having an orifice therethrough, a segment of said die block being slidably supported on the tapered surfaces of the guide members, and means for imparting co-planar axial movement to the segmental die block as a unit relative to the container and guide members as a unit, whereby said relative movement effects separation of the segments of the die block to enlarge the orifice therethrough in direct relation to the axially complementary tapered surfaces on the guide members and interior contiguous surface of the container.

5. An extrusion apparatus for producing extrusions of varying lineal cross section by indirect extrusion, said apparatus comprising a container having a contiguous interior surface of generally cylindrical form an uninterrupted portion of which is tapered axially of its length in arcuate width not exceeding the smallest diameter of the interior surface of the container, a guide member within said container fixed in respect thereto and presenting a complementary tapered surface spaced from, facing and parallel to the uniformly tapered interior surface of the container, a segmental die block slidable on and peripherally sealed in respect to the interior surface of the container and having an orifice therethrough, a segment of said die block being slidably supported on the tapered surface of the guide member, and means for imparting co-planar axial movement to the segmental die block as a unit relative to the container and guide member as a unit, whereby said relative movement effects separation of the segments of the die block to enlarge the orifice therethrough in direct relation to the axially complementary tapered surfaces on the guide member and interior contiguous surface of the container.

6. In an extrusion apparatus of the type defined in claim 5, a die block having a pair of die segments separable in response to co-planar unitary movement of the die block to enlarge an orifice formed therebetween, and said die segments having overlapping portions defining portions of the periphery of the orifice in all positions of separation of the die block segments.

References Cited in the file of this patent

UNITED STATES PATENTS

| | | |
|---|---|---|
| 2,289,787 | Kaschke et al. | July 14, 1942 |
| 2,365,482 | Manken et al. | Dec. 19, 1944 |
| 2,392,336 | Nisson | Jan. 8, 1946 |
| 2,664,996 | Andrews | Jan. 5, 1954 |

FOREIGN PATENTS

| | | |
|---|---|---|
| 887,226 | France | Nov. 8, 1943 |